July 26, 1955   F. L. HAWKINS   2,713,737
VEHICLE OPERATED AUTOMATIC GATE
Filed July 25, 1950   6 Sheets-Sheet 1

INVENTOR.
FLOYD L. HAWKINS
BY Jennings & Carter
ATTORNEYS

July 26, 1955

F. L. HAWKINS 2,713,737

VEHICLE OPERATED AUTOMATIC GATE

Filed July 25, 1950

INVENTOR.
FLOYD L. HAWKINS
BY
Jennings & Carter
ATTORNEYS

July 26, 1955 F. L. HAWKINS 2,713,737
VEHICLE OPERATED AUTOMATIC GATE
Filed July 25, 1950 6 Sheets-Sheet 5

INVENTOR.
FLOYD L. HAWKINS
BY Jennings & Carter
ATTORNEYS

July 26, 1955     F. L. HAWKINS     2,713,737
VEHICLE OPERATED AUTOMATIC GATE
Filed July 25, 1950     6 Sheets-Sheet 6

INVENTOR.
FLOYD L. HAWKINS
BY Jennings & Carter
ATTORNEYS

United States Patent Office 2,713,737
Patented July 26, 1955

2,713,737

VEHICLE OPERATED AUTOMATIC GATE

Floyd L. Hawkins, Birmingham, Ala.

Application July 25, 1950, Serial No. 175,780

5 Claims. (Cl. 39—43)

My present invention relates to automatic gates and has for an object the provison of a gate which shall be opened upon engagement of the wheels of a vehicle or the like with members disposed in the roadway on either side of the gate, and which shall close after the vehicle has passed through the opening in the fence or the like controlled by the gate.

Another object is to provide a vertically movable gate which shall be pivoted to a post at one end and having connected thereto springs or the like substantially counterbalancing the weight of the gate, thereby requiring relatively little force to open the gate, and mechanism permitting the gate to close by gravity without unnecessary shock and providing a time lag between movement from open to closed position sufficient to permit the vehicle or persons to pass beneath the gate while it is raised.

My invention further contemplates latch mechanism which shall be automatically movable to unlatch the gate for opening movement when the roadway actuating members first move toward gate raising position, and latch mechanism which shall be capable of manual disengagement, permitting the free end of the gate to be raised by persons on foot desiring to pass beneath the gate.

My invention contemplates control mechanism for the closing movement of the gate embodying either the use of a hydraulic cylinder, an arrangement of pawls and ratchets, or a holding means for the gate operable while the vehicle is passing therethrough, the gate being counterbalanced either by springs or weights.

A further object is to provide a positively operating gate which shall not be capable of being opened by animals which may be within the enclosure controlled by the gate but which nevertheless may be easily opened by a vehicle or by a person on foot.

Apparatus illustrating the features of my invention is shown in the accompanying drawings forming a part of this application in which:

Fig. 18 is an enlarged fragmentary sectional view of a modified form of roadway actuating mechanism employed with the gate raising and lowering mechanism shown in Figs. 14 to 17, inclusive;

Fig. 19 is a view corresponding to Fig. 18 with the mechanism moved to gate raising position; and, Fig. 20 is a plan view of the mechanism shown in Fig. 19.

Figure 1:
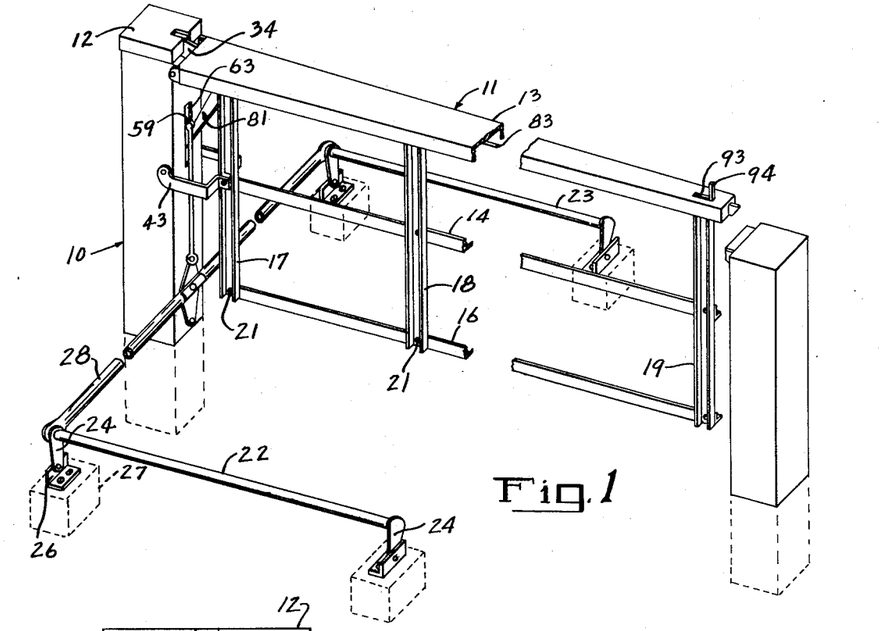
Fig. 1 is a fragmentary, somewhat diagrammatic isometric view of a gate embodying my invention, some parts being broken away and the gate being shown in slightly raised position.

Referring now to the drawings for a better understanding of my invention and more particularly to Fig. 1, I show a vertical supporting post 10 to which may be pivotally mounted my improved form of gate indicated generally by the numeral 11. The post 10 may be a hollow, fabricated post made of sheet iron and may be provided with a cover 12. The post is suitably supported in vertical position by burying one end in the ground, or in a concrete foundation or the like.

The gate 11 comprises a main longitudinal or cross member 13 which may be in the form of a channel with the legs downturned. The gate also comprises intermediate longitudinal members 14 and lower members 16, which as shown may be angles. The cross members are pivotally secured to each other by means of a vertical member 17 adjacent the post 10, an intermediate vertical member 18, and an end vertical member 19. The pivotal connection at the crossing points of the members may be by means of screws 21 or the like as illustrated. This construction provides a gate in which the several members thereof tend to assume parallel positions when the gate is raised as will appear as the description proceeds.

The mechanism for raising the gate comprises a pair of cross rods 22 and 23, one on either side of the gate and extending transversely of the roadway. The rods are supported above the level of the roadway on arms 24 in turn pivotally connected to the vertical legs of angle brackets 26 anchored in any suitable manner to foundations 27 imbedded in the roadway, beneath the level thereof. A tie rod 28 is pivotally connected to one end of the rods 22 and 23, thus to move longitudinally whenever the wheels of a vehicle or the like strike either of the rods 22 or 23.

Figure 5:
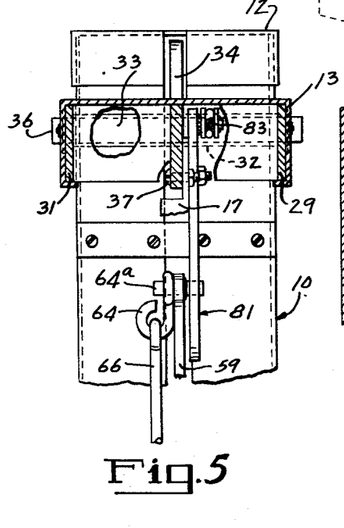
Fig. 5 is a detail sectional view with parts broken away taken generally along line V—V of Fig. 2.
Figure 7:
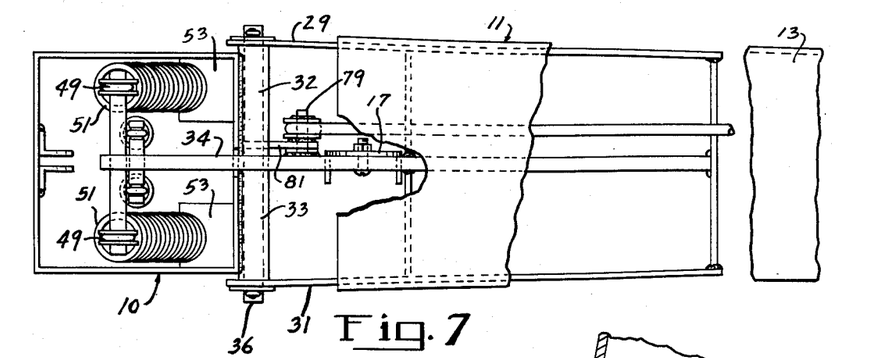
Fig. 7 is an enlarged fragmentary plan view of the pivoted end of the gate and supporting post with the cover for the post removed and with certain parts omitted and broken away.

The upper cross member 13 of the gate may taper as viewed in plan from the end adjacent the post 10 to its outer end. At the end of the channel member 13 adjacent the post 10 are bars 29 and 31 welded to the vertical flanges of the cross member 13. See Figs. 5 and 7. Welded to the face of the post 10 are a pair of axially aligned, spaced apart tubes 32 and 33. Projecting from the post end of the member 13 is an extension member 34 which fits between adjacent ends of the tubes 32 and 33. Passing through the members 29, 31, 32, 33, and 34 is a cross pin 36 providing a pivot for the gate.

Figure 2:
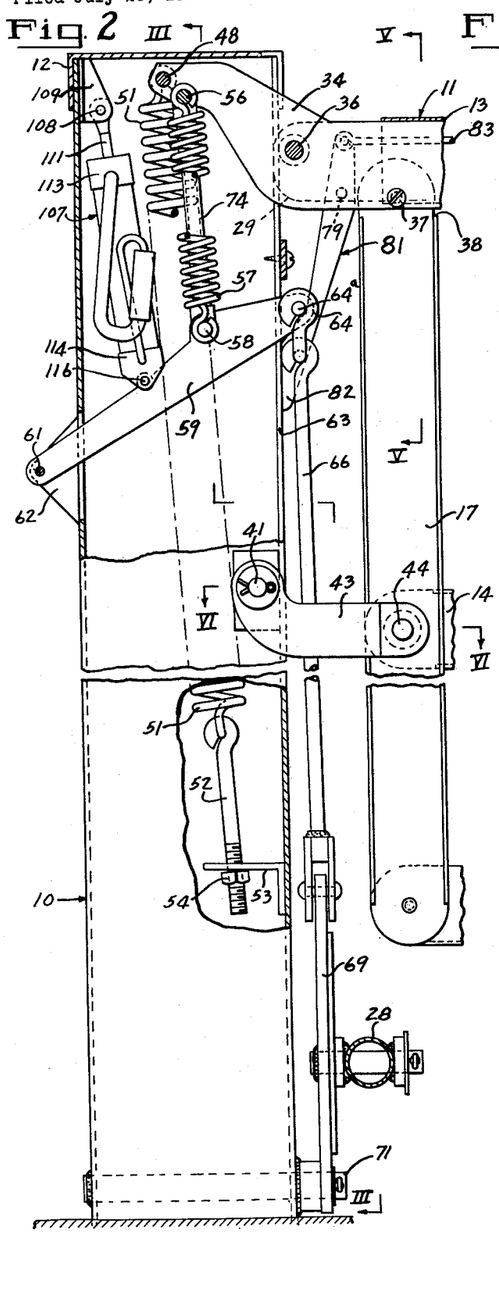
Fig. 2 is an enlarged fragmentary vertical sectional view with parts broken away through the supporting post for the gate and illustrating the pivoted gate in fully closed position.

The vertical gate member 17 adjacent the post 10 is pivoted to the member 34 by means of a screw 37 as best shown in Fig. 2. In order to make this pivotal connection I cut away the flanges of the member 17 as indicated at 38, leaving an extending portion of the base of the channel 17 extending upwardly to take the screw 37.

Figure 6:
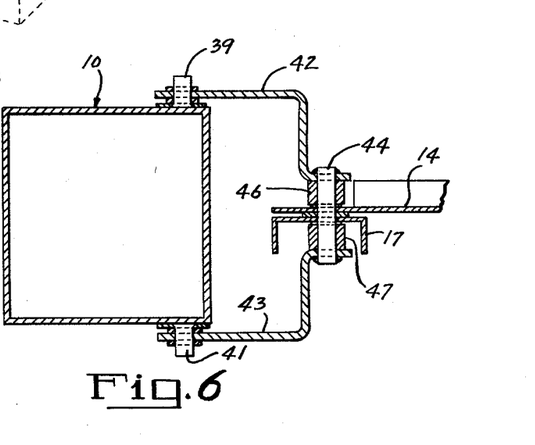
Fig. 6 is a detail sectional view taken generally along line VI—VI of Fig. 2.

As best shown in Figs. 2 and 6, I secure a pair of trunnions 39 and 41 to the sides of the post, adjacent the front thereof and at a point beneath the point where the tubes 32 and 33 are welded. Pivotally mounted on the trunnions are yoke members 42 and 43 which are cross connected adjacent their outer ends by means of a pin 44 which may be welded thereto. The pin 44 passes loosely through a hole in the member 17 and a hole provided in the intermediate member 14 of the gate. Spacer blocks 46 and 47 may be provided around the pin 44.

Figure 3:
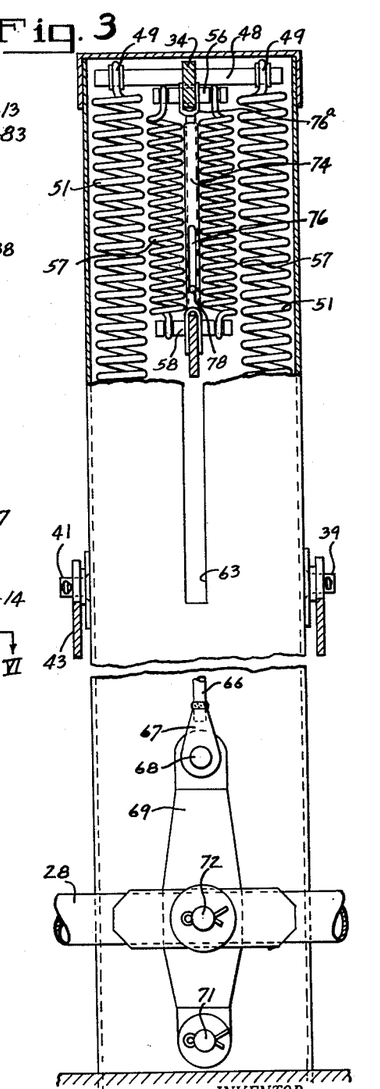
Fig. 3 is a detail fragmentary sectional view taken generally along line III—III of Fig. 2.

As best illustrated in Figs. 2 and 3, the end of the extension member 34 is provided with a cross pin 48. Secured about the projecting ends of the pin 48 are the upper ends 49 of a pair of tension springs 51. The lower ends of the springs 51 are secured to I-bolts 52 having their lower threaded ends passing loosely through openings provided in brackets 53 carried by the front wall of the post 10. A nut 54 provides means for adjusting the tension of the springs.

Likewise provided in the extension 34 is a second pin 56. The hook ends of a pair of smaller tension springs 57 are engaged about the projecting ends of the pin 56. The lower ends of the springs 57 are secured to a cross pin 58 passing through an arm 59, pivotally mounted as at 61, between suitable brackets 62 carried by the rear of the post.

The forward end of the arm 59 projects through a slot 63 provided in the front of the post. In the projecting outer end of the arm 59 is pivotally mounted a hook 64. Secured to the lower end of the hook 64 is the upper end of a pull rod or tension member 66. The lower end of the pull rod carries a clevis 67 pivotally connected as at 68 to the upper end of an arm 69. The lower end of the arm 69 is pivotally connected to a pin 71 outstanding from the front of the post 10. The tie rod 28 is pivotally connected as at 72 to the arm 69 at a point intermediate the points 71 and 68.

Figure 4:
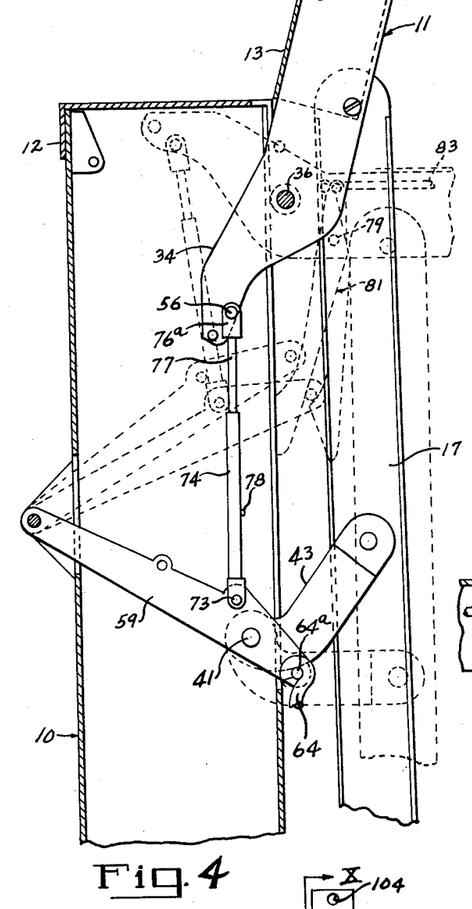
Fig. 4 is a view corresponding generally to Fig. 2 with certain of the parts omitted for the sake of clarity and illustrating the gate in several positions assumed during the unlatching and raising movements thereof.

Referring more particularly to Figs. 3 and 4 I pivotally connect to the arm 59 as at 72 the lower end of an upwardly disposed tube 74. The tube 74 is provided with an axially elongated slot 76. Pivotally connected to the pin 56 carried by the extension member 34 is a clevis 76a carrying a downwardly extending rod 77. The rod 77 is slidably telescoped within the tube 74 and carries a pin 78 projecting through the slot 76.

On the extension member 34, forwardly of the pivotal connection therefor provided by the cross pin 36, is an outstanding pin 79. Pivotally connected to the pin 79 is a depending latch release arm 81. The arm 81 is provided with a lower foot portion 82 which comes to rest against the front side of the post 10 when the gate is down. It will be noted that the lower end of the arm 81 lies forwardly of the projecting pin 64a when the gate is down, and in the path of the pin.

Figure 9:
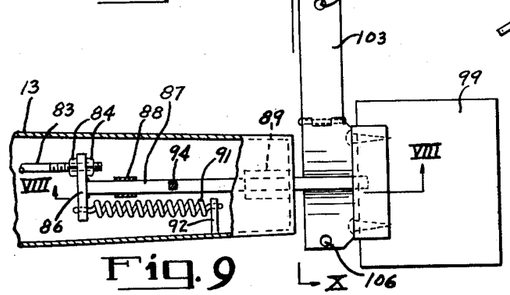
Fig. 9 is an enlarged horizontal sectional view through the free end of the gate and showing the latch in the keeper.
Figure 10:
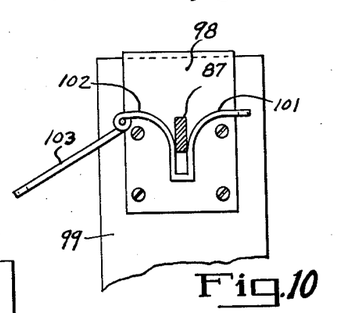
Fig. 10 is a detail sectional view taken generally along line X—X of Fig. 9.

Pivotally secured to the upper end of the arm 81 is one end of a latch release pull rod 83. As best shown in Fig. 9 the other end of the rod 83 is adjustably connected by means of bolts 84 to a cross member 86 secured on the end of a latch bar 87. The latch bar is longitudinally slidably in suitable bearings 88 and 89. A spring 91 has one end anchored to the member 86 and the other end to a bracket 92 carried by the depending flanges of the member 13. As shown in Fig. 1, the member 13 is slotted at 93. Extending upwardly from the latch bar and through the slot 93 is a manual operating member 94 by means of which the latch may be moved to the left as viewed in Figs. 1 and 9.

Figure 8:
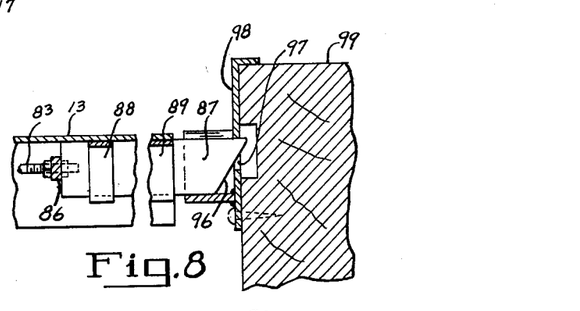
Fig. 8 is a detail fragmentary sectional view of the latch at the free end of the gate together with the keeper carrying post, the view being taken generally along line VIII—VIII of Fig. 9.

The outer lower end of the latch bar 87 is tapered as indicated at 96. The outer end of the latch bar 87 is disposed to fit into a slot 97 provided in a keeper 98 mounted on a post 99 adjacent the free end of the gate. The keeper may be provided with outwardly flared side walls outstanding from the face of the post 99, as indicated at 101 and 102. These walls provide guide means for causing the latch to properly center with respect to the notch 97 when the gate is being lowered. If desired, a hinged cover 103 may be provided together with openings 104 and 106 through which may be passed a lock, thus to lock the gate in down position when desired. It will be noted that the latch bar 87 can be moved only a limited amount to the left as viewed in Figs. 1, 8 and 9, the member 94 serving to limit leftward movement by co-action with the left hand end of the slot 93 in the member 13. Thus, when the hinged cover 103 is locked in closed position, the latch bar cannot be withdrawn from beneath the cover.

Figures 11, 12:
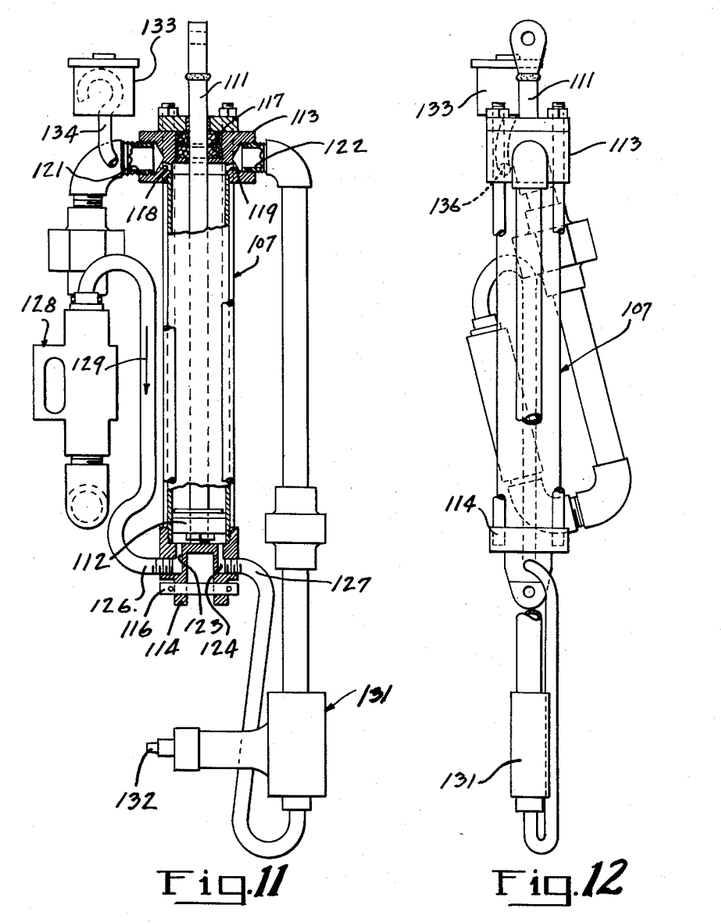
Fig. 11 is a vertical view partly broken away and in section and illustrating the hydraulic cylinder and valve mechanism for controlling the lowering of the gate.
Fig. 12 is a view taken generally at right angles to Fig. 11 and showing the hydraulic control mechanism.

The mechanism for gradually lowering the gate once the same has been raised will now be explained. In general, such mechanism comprises a hydraulic cylinder indicated by the numeral 107. As best illustrated in Figs. 2, 11 and 12 I pivotally mount as at 108 to suitable brackets 109 in the post 10 the upper end of the piston rod 111 of the cylinder 107. The piston 112 is slidably mounted in the cylinder 107 and is provided with packing in the manner understood.

The cylinder is provided with an upper head 113 and a lower head 114. The lower head 114 is pivotally connected as at 116 to the arm 59 at a point intermediate the pivot point 61 and the pin 58 to which are connected the springs 57. The upper head 113 contains suitable packing 117 through which the piston rod 111 slidably passes.

The upper head 113 is drilled as at 118 and 119 to receive pipe connections 121 and 122, respectively. The lower head 114 is drilled as at 123 and 124 to receive pipe connections 126 and 127, respectively. Connected between the pipes 121 and 126 is a check valve indicated generally in the drawings by the numeral 128. The check valve is arranged to permit a flow of fluid only from the pipe 121 to the pipe 126 as indicated by the arrow 129.

Connected between pipe connections 122 and 127 is an adjustable needle valve indicated by the numeral 131. The needle valve may be suitably adjusted to regulate the flow of fluid in the pipes controlled by the same by means of a stem 132. A reservoir 133 for a make up supply of hydraulic fluid is connected by a pipe 134 to the upper head 113 at the point 136, Fig. 12.

From the foregoing the method of constructing and operating my improved gate may now be readily explained and understood. It will be apparent that whenever the wheels of a vehicle strike either of the roadway actuating rods 22 or 23 to move the tie-rod 28 longitudinally, such movement is effective to pull downwardly on the rod 66. The first action caused by the commencement of downwardly movement of the rod 66 is for the pin 64a carried in the outer end of arm 59 to engage the side of the latch member 81 adjacent the post 10, pivoting the latch about its pivot point 79, moving the latch release rod 83 leftward as view in Figs. 1, 2 and 9, thereby withdrawing the latch bar 87 from the keeper slot 97. This motion is permitted without commencing to raise the gate due to the lost-motion connection afforded by the slotted tube 74, rod 77 and the pin 78 carried by the rod 77 and projecting through the slot 76 in the tube 74. As soon as the pin 78 reaches the bottom of the slot 76 a rigid connection is effected between the arm 59 and the extension member 34. Further downward movement of the tie rod 66 occasioned by continued rocking movement of the members 22 or 23 thus raises the gate. This action is accomplished due to the fact that the arm 59 is being pulled downwardly, the force being transmitted through the tube 74, pin 78, rod 77 and thence to pivot point 56 on the extension member 34. The heavy counter-balance springs 51 are set so as to substantially counter-balance the weight of the gate, whereby relatively small force on the pull rod 66 is required to raise the gate. During downward movement of the arm 59, pivoting about its pivot point 61, the cylinder 107 moves downwardly. This causes hydraulic fluid above the piston 112 thereof to flow through the check valve from the opening 118 above the piston to the opening 123 below the piston.

As soon as the rear wheel of the vehicle has passed over the bar 23, assuming that the vehicle approaches the gate from the side on which is placed the bar 22, the gate tends to move downwardly by gravity. This action is snubbed through the medium of the needle valve 131 which restricts the flow of fluid from beneath the piston 112 to the opening 119 in head 113. It will be understood that the check valve 128 is effective to prevent reverse flow of fluid, and hence that all fluid below the piston 112 when the gate is in raised position must pass through the lines 127, valve 131, thence pipe connection 122 to again fill the cylinder above the piston 112. Oil necessary to make up the difference in volume occasioned by withdrawing the piston rod 111 and also to make up any oil which may leak from the system is fed to and from the reservoir 133 to the pipe 134 as will be readily understood. As the gate approaches lowered position the tapered end 96 of the latch bar 87 strikes the keeper plate 98, moving the latch release arm 81 outwardly, permitting pin 64a to ride behind the same, whereby when the gate is completely lowered the parts assume the position shown in Fig. 2, completing an opening and closing cycle. It will be noted that the springs 57 are fully effective to return the parts to the position shown in Fig. 2, and that they act independently of the main counterbalancing springs 51 for aiding in raising the gate.

Figure 13:
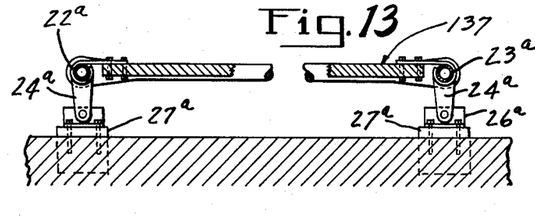
Fig. 13 is an enlarged view illustrating a modified form of actuating mechanism for raising the gate which may be employed with certain parts of the mechanism illustrated in Figs. 1 to 12 inclusive.

Referring now to Fig. 13 of the drawing I show a somewhat modified form of mechanism which may be employed with certain parts of the apparatus just described. By using the slightly modified roadway gate raising mechanism now to be described I am enabled to eliminate completely the hydraulic cylinder.

The modification just mentioned comprises essentially a platform 137 which is pivotally connected to arms 24a suitably supported on brackets 26a, in turn fixed to concrete foundations 27a imbedded in the roadway. Cross rods 22a and 23a function identically with the rods 22 and 23. The only difference in the modification shown is that by permitting the vehicle to ride up on the platform 137, whereby the whole structure pivots either to the right or left as viewed in Fig. 13, I directly actuate the pull rod 66. So long as the vehicle or any wheel thereof remains on the platform 137 the gate remains in raised position. As soon as the vehicle runs off the platform the gate comes down by gravity, and since the vehicle has cleared from beneath the gate the hydraulic cylinder is not necessary to slowly lower the gate. It will be understood that the roadway mechanism illustrated in Fig. 13 is associated with all of the structure shown in Figs. 1 to 10 inclusive, except that the hydraulic cylinder may, if desired, be omitted.

Referring now more particularly to Figs. 14 to 20, inclusive, I show a still further modified form of the gate raising and closing mechanism. The form of the control mechanism for the gate now to be described consists essentially of sets of mechanically actuated arms and pawls carried thereby, in combination with a rotatable member having teeth with which the pawls cooperate, whereby the gate is raised, held in raised position, and then lowered after the vehicle has passed over the roadway members.

Figure 17:
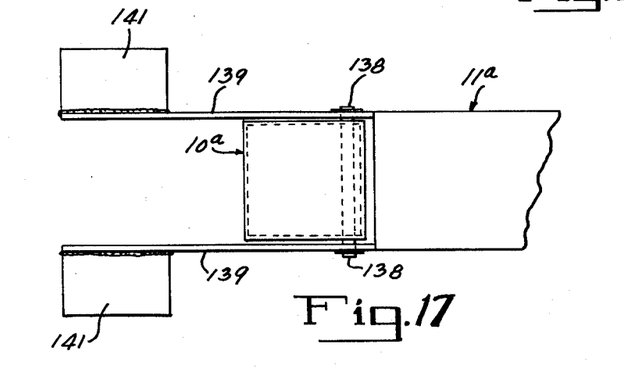
Fig. 17 is a diagrammatic fragmental plan view of the gate shown in Figs. 14, 15 and 16.

As shown in Fig. 17 the gate indicated generally by the numeral 11a is pivoted to the post 10a as at 138. The gate may have extension members 139 straddling the post 10a, and each of the members may carry a counter-weight 141 on its outer end. The gate 11a comprises the pivoted members already described. The description of the specific pivoted construction of the gate will not be repeated in connection with the modification now being described. Suffice it to say that insofar as the gate itself is concerned the same may conveniently be precisely the one previously described.

Figure 14:
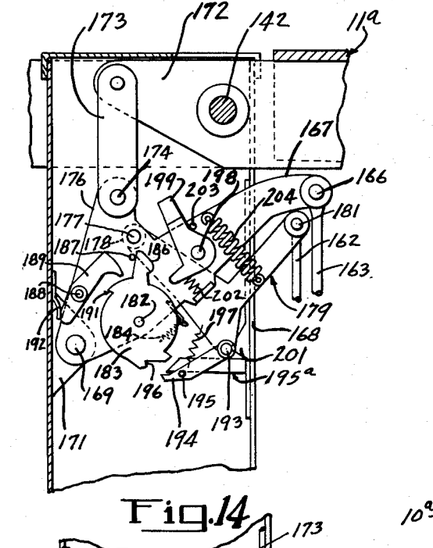
Fig. 14 is an enlarged vertical sectional view through the upper end of a supporting post for the gate and showing a modified, mechanically operated gate raising and lowering mechanism, constituting another modification of my invention.
Figure 15:
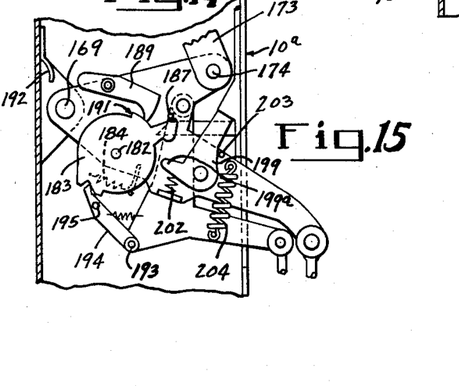
Fig. 15 is a view similar to Fig. 14 and showing the parts with the gate raised.

The gate 11a is pivotally mounted on a rod or pin 142 adjacent the upper end of the post 10a. Pivotally mounted adjacent the base of the post 10a is an arm 143, movable on a pivot pin 144. Also pivotally mounted on the pin 144 are a pair of upwardly extending links 146 and 147. The links may be suitably spaced apart by means of spacers 148 surrounding the pin 144. Pivotally connected to the upper end of link 146 is a relatively short link 149 and pivotally connected to the upper end of link 147 is a second relatively short link 151. The upper ends of the links 149 and 151 are pivotally connected by a rivet or the like 152.

Pivotally connected to the links 147 and 151 at the point where the links are themselves pivotally joined is the inner end of a push-pull rod 153. The other end of the rod 153 is pivotally connected as at 154 to the upper end of an arm 156, corresponding to the arm 24, in turn pivotally connected as at 157 to a bracket 158, corresponding to the bracket 26. A roadway cross member in the form of a pipe 159 is carried by the arm 156, and corresponds in function to the cross members 22 and 23.

A similar push-pull rod 153a is pivotally connected at the point 161 where the links 146 and 149 are connected. It will be understood that the other end of the link 153a is connected in suitable manner to one of its arms 156, pivotally mounted on a bracket 158, and that a second roadway cross member 159 is provided.

Figures 18, 19, 20:
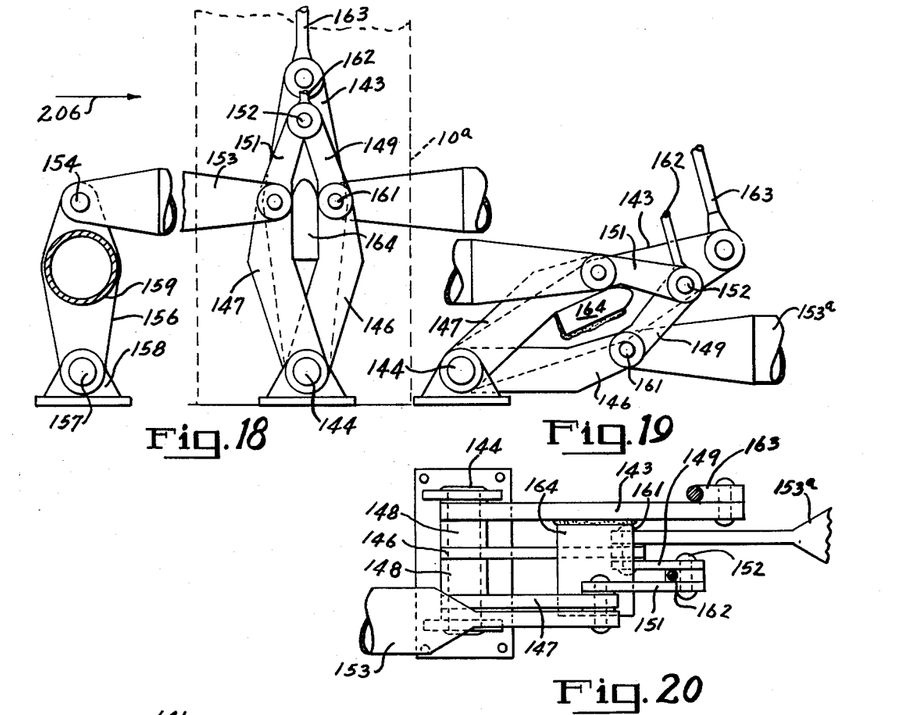

Pivotally connected to the point 152 is an upwardly extending pull rod 162. Pivotally connected to the end of the arm 143 is a second upwardly extending pull rod 163. As will presently appear, rods 162 and 163 constitute means for raising the gate, controlling the pawl and ratchet mechanism for holding the gate and lowering the same. As best shown in Figs. 19 and 20 I weld to the inner face of the arm 143 an outwardly disposed block 164 which projects between the links 146—149 and 147—151. The purpose of this block in the functioning of the apparatus will presently appear.

The upper end of the rod 163 is pivotally connected as at 166 to the outer end of an arm 167 projecting through a slot 168 in the front of the post 10a. The arm 167 is pivotally connected at 169 to brackets 171 carried on the rear inner wall of the post 10a. An extension member 172 carried by the gate 11a has pivotally connected thereto the upper end of a link 173, in turn pivotally connected at 174 to an extension 176 on the arm 167.

Pivotally connected to the arm 167 as at 177 is an upwardly extending portion 178 of a second arm 179. The arm 179 likewise projects through the slot 168 and the pull rod 162 is connected to the outer end thereof at the point 181.

Rotatably mounted on a pin 182 projecting from a side of arm 167 is a disc member 183. The disc member 183 is biased counter-clockwise as viewed in Figs. 14, 15 and 16 by means of a spring 184. An outwardly extending portion 186 contacts a stop 187 carried by the arm 167 to limit the counter-clockwise rotational movement of the member 183.

Pivotally mounted to the arm 167 as at 188 is a pawl 189. The pawl 189 is disposed to engage in a tooth 191 provided on the edge of the member 183. The pawl 189 is normally held out of engagement with the member 183 by means of a small leaf spring 192 so disposed as to engage the end of the pawl opposite the tooth engaging end when the parts are in the position shown in Fig. 14.

Pivotally mounted to the arm 179 at the point 193 is a pawl 194 disposed to cooperate selectively with teeth 196 on the member 183. A spring 197 biases the tooth engaging end of the pawl into contact with the member 183.

Pivotally mounted on the arm 167 at the point 198 is a pawl 199 which is disposed to coact with a stop 203 on the front of the post thus to hold the gate raised as will presently appear. A spring 202 biases the pawl into contact with a stop 203 carried on the arm 167. The arms 167 and 179 are biased toward each other by means of a spring 204.

From the description just given the operation of the modification of my invention just described may now be explained and understood. If it be assumed that a vehicle approaches to strike the cross member 159 in the roadway, approaching in the direction of the arrow 206, Fig. 18, it will be seen that the rod 153 is moved to the right as viewed in Figs. 18 and 19. This action causes the arm 143 to move downwardly about its pivot point somewhat to the position shown in Fig. 19. In this position the block 164 contacts the links 147 and 151 adjacent their pivot points, also pulling downwardly on the pull rod 162. Starting with the several parts in the position shown in Fig. 14 it will be seen that when the front wheels of the vehicle have passed over the member 159 on the side from which the vehicle is approaching, the parts will have moved to the position shown in Fig. 15 wherein the gate is raised. In this position it will be seen that the entire arm, pawl, and control member mechanism have shifted downwardly about the pivot point 169. This releases pawl 189, permitting its overweighted tooth engaging end to fall by gravity into contact with the periphery of the member 183. Additionally, the pawl or dog 199 has its upper end engaged beneath the stop 201 whereby the gate is held locked in raised position. When the rear wheels of the vehicle pass over the member 159 on the approach side of the gate, it will be seen that no further movement of the linkage mechanism in the roadway is effected because the block 164 prevents any further relative movement of the linkage shown. However, when the front wheels of the vehicle pass over the roadway member 159 on the far side of the gate from the approach side, thus exerting a pull on tie rod 153a, the linkage consisting of the members 146 and 149 pull away from the block 164, thus pulling downwardly on the pull rod 162. This causes the pawl 194 to engage the tooth with which it is associated and carried by the member 183, rotating the member 183 from position shown in Fig. 15 to the position shown in Fig. 16. This places the projecting member 186 in contact with the foot 199a of the pawl 199, and with the pawl 194 engaged behind the last of the teeth 196. Further, the pawl 189 has now engaged behind the tooth 191.

Figure 16:
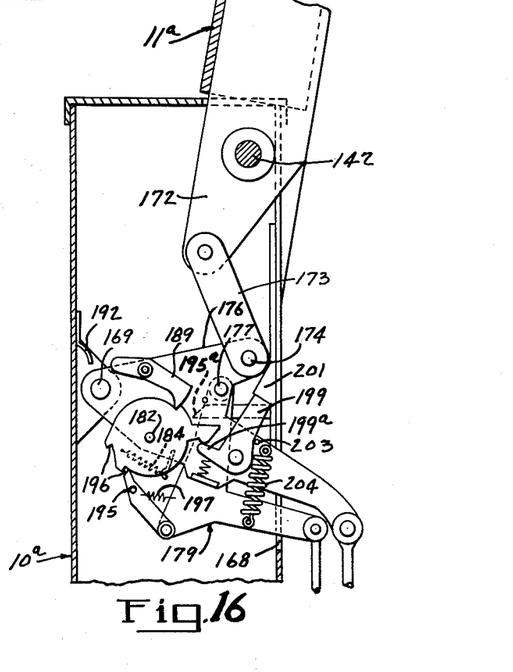
Fig. 16 is a view corresponding generally to Fig. 15 and with the gate about to be lowered.

The parts assume the position shown in Fig. 16 at the time when the vehicle's front and rear wheels straddle the roadway member 159 on the far side of the gate. Thus, when the rear wheels of the vehicle pass over the far side roadway member 159 for the last actuation thereof, exerting a second downward pull on the rod 162, the pawl 194 rotates the member 183, causing its extension 186 to rock the pawl 199 from beneath the stop 201, permitting the whole lever assembly to pivot upwardly again about the point 169. The gate thus lowers gradually, due to the counterbalancing effect of the weights 141. As the arms move upwardly back toward the position shown in Fig. 14 from the position shown in Fig. 16 the outer end of the pawl 189 contacts the leaf spring 192, thus withdrawing the pawl from the tooth 191, permitting the spring 184 to return the member 183 to the position with the extension 186 in contact with stop 187. The pawl 194 is provided with a pin 195 which projects outwardly thereof on the far side as viewed in Figs. 14 to 16. Secured to the post and disposed in the path of the pin 195 is a stationary member 195a adapted to withdraw the end of pawl 194 from the teeth 196 when the parts are in the position shown in Fig. 14. Thus, upon return movement of the parts from the position shown in Fig. 16, the pin 195 and member 195a are effective to release the ratchet member 183 for counterclockwise rotation to return position in response to the action of its spring 184. The gate thus lowers and the cycle of raising and closing is completed.

It will be understood that if a vehicle approaches the gate from the opposite side of the gate the movements first described take place in the manner explained. The expression "near side of the gate" means that side thereof from which the vehicle approaches, while the expression "far side of the gate" means the opposite side of the gate from the approach side.

From the foregoing it will be apparent that I have devised an improved automatic gate which is fully effective for its intended purposes. With either modification of my invention I provide an economical, positively actuating gate. Due to the well known fact that animals will not place their hoofs upon iron rods or the like I provide a gate in which animals will not open the same. By suitably counterbalancing the gate with the springs or counterweights I make the gate easily capable of being opened by a person on foot, only 15 to 20 pounds pressure being required on either of the roadway members to raise the gate. It will further be seen that the automatic latch shown in the first described modification may be associated with the form of the invention shown in Figs. 14 to 20, inclusive, by providing suitable linkage as described in connection with the first modification.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In an automatically operable gate, a gate structure including a gate proper, a supporting post, means pivotally connecting one end of the gate to the post for movement in a vertical plane, counter-balance means connected to the gate structure and partially counter-balancing the gate about its pivot point, an arm pivoted to the post and extending outwardly therefrom toward the gate, a downwardly movable tension member connected to the outer end of the arm and operable upon downward movement to raise the gate, interconnected vehicle engaging members disposed in the path of a vehicle approaching the gate from either side thereof and disposed to be moved when contacted by the vehicle, means connecting the movable members to the tension member to pull the latter downwardly upon engagement of the vehicle with either of said movable members, and means operable after the gate is raised and the vehicle has passed beneath the same to lower the gate with a controlled rate of downward movement.

2. In an automatic gate, a gate structure including a gate proper, a post, a bracket pivotally connecting one end of the gate to the post and having an end extending outwardly of the gate past said pivot point, a gate counterbalancing spring anchored at one end to the post and at the other end to the outwardly extending end of the bracket, an arm pivoted to the post and extending outwardly therefrom on the side toward the gate, a fluid pressure cylinder having a piston and piston rod operatively connected between the post and said arm at a point between the pivot point and outer end of the arm, a tension member connected to the outer end of the arm and operable upon downward movement to raise the gate, vehicle engaging means on either side of the gate operable upon being engaged by a vehicle to pull said tension member downwardly, and fluid control means operatively associated with said cylinder permitting the piston thereof to move freely within the cylinder when the gate is moving upwardly and retarding reverse movement of the piston when the gate is moving downwardly.

3. The combination with raising and lowering mechanism for a gate pivoted for vertical movement to a supporting post and in which the gate is provided with a latch, of a vehicle engaging cross member in the roadway on either side of the gate, arms pivotally supporting said cross members, a tie rod interconnecting the cross members, a tension member connected adjacent its lower end to said tie rod and movable downwardly upon engagement of a vehicle with either of said cross members, an arm pivoted to said post and extending outwardly therefrom toward the gate, a pivotal connection between the outer end of said arm and the upper end of said tension member, latch releasing and gate raising mechanisms operatively connected to said arm and a fluid pressure cylinder connecting said supporting post to said arm for lowering the gate at a retarded rate of descent.

4. In a gate of the type pivoted at one end to a post for movement in a vertical plane and carrying a reciprocable latch cooperating with a keeper to latch the gate when the gate is in lowered position, the improvements comprising a member at either side of the gate disposed transversely of the roadway, pivoted links supporting said transverse members above the level of the roadway whereby upon being engaged by the wheels of a vehicle they move downwardly toward the roadway, a tie bar pivotally connected at each end to the transverse members, an arm pivotally mounted at its lower end to the post, means pivotally connecting the tie bar to the arm above the pivot point of said arm whereby upon movement of the tie bar in either direction the upper end of the arm moves downwardly, a latch release and gate raising pull rod pivoted at its lower end to the upper end of the arm, a second arm pivoted to said post and extending outwardly therefrom toward the gate, a pivotal connection between the outer end of said second arm and the upper end of said pull rod, latch releasing and gate raising mechanisms operatively connected to said second arm, said gate raising mechanism embodying a lost motion connector effective to first actuate the latch releasing mechanism and subsequently actuate the gate raising mechanism upon downward movement of the pull rod, and means operable upon passage of the last wheels of a vehicle over the transverse member on the far side of the gate permitting the gate to lower by gravity.

5. In an automatic gate of the type embodying a gate structure pivotally mounted at one end for movement in a vertical plane to a post and members disposed in the roadway on either side of the gate disposed to be engaged by a vehicle approaching the gate from either side to raise the gate, the improvement comprising a horizontally reciprocable latch at the free end of the gate, a keeper in which the latch engages when the gate is down, a pull rod connected at one end to the latch, an arm pivotally mounted on the gate adjacent its pivoted end to which the opposite end of the pull rod is secured, a second arm pivotally connected to the post and extending outwardly therefrom toward the gate, a pin adjacent the outer end of said second arm engageable with the arm on the gate and disposed upon downward movement of said second arm to rock said gate arm on its pivot, a downwardly extending tension member pivotally connected adjacent its upper end to said pin, and a member operatively connecting the roadway members and the tension member for moving said tension member downwardly when a vehicle engages either of the roadway members, thereby to unlatch the gate.

References Cited in the file of this patent

UNITED STATES PATENTS

| 430,103 | Day et al. | June 10, 1890 |
| 859,901 | Cline | July 9, 1907 |
| 876,166 | Gard | Jan. 7, 1908 |
| 893,449 | Cox | July 14, 1908 |
| 1,105,434 | Hopkins | July 28, 1914 |
| 1,835,430 | Ritchie | Dec. 8, 1931 |